United States Patent
Darby et al.

(10) Patent No.: US 10,594,840 B1
(45) Date of Patent: Mar. 17, 2020

(54) BOT FRAMEWORK FOR CHANNEL AGNOSTIC APPLICATIONS

(71) Applicant: West Corporation, Omaha, NE (US)

(72) Inventors: Kenneth A. Darby, Papillion, NE (US); Geoffrey A. Finch, Omaha, NE (US); Sammy Sufian, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 15/903,440

(22) Filed: Feb. 23, 2018

(51) Int. Cl.
*G06F 3/00* (2006.01)
*G06F 9/44* (2018.01)
*G06F 9/46* (2006.01)
*G06F 13/00* (2006.01)
*H04L 29/08* (2006.01)
*H04W 4/14* (2009.01)
*H04L 12/58* (2006.01)

(52) U.S. Cl.
CPC ............ *H04L 67/34* (2013.01); *H04L 69/329* (2013.01); *H04W 4/14* (2013.01); *H04L 51/02* (2013.01)

(58) Field of Classification Search
CPC ....................................................... H04L 67/34

USPC .......................................................... 719/328
See application file for complete search history.

(56) References Cited

U.S. PATENT DOCUMENTS

2016/0044380 A1* 2/2016 Barrett ............... H04N 21/4826
725/53
2019/0019077 A1* 1/2019 Griffin ................... G06N 3/006

* cited by examiner

*Primary Examiner* — Timothy A Mudrick (57) ABSTRACT

An example operation may include one or more of receiving a bot communication request from a user device, the bot communication request comprising content from on one or more of a spoken utterance and a typed input received via the user device, retrieving configuration information comprising credentials and unique communication protocol information for each of a plurality of bot services, automatically determining a bot service for responding to the bot communication request from among the plurality of bot services, and establishing a communication channel with the determined bot service based on unique credentials of the determined bot service, and transmitting the bot communication request to the determined bot service via the established communication channel based on unique communication protocol information of the determined bot service.

20 Claims, 6 Drawing Sheets

FIG. 1
(Network Environment)

BOT FRAMEWORK FOR CHANNEL AGNOSTIC APPLICATIONS

TECHNICAL FIELD

This application generally relates to a bot communication framework, and more particularly, to a system, method, and non-transitory computer readable medium which generates an interface between a software application and a plurality of bot conversation engines enabling the software application to dynamically interact with multiple bot conversation engines.

BACKGROUND

A chatbot, also referred to as a bot, a chatterbot, an agent, etc., is a computer program which conducts a conversation via audio and/or textual communications. The bot is typically designed to be an automated service that simulates communication from a human conversational partner. Bots are commonly used in dialog systems for purposes such as customer support, human resources, information acquisition, points of contact, and other enterprise-oriented services. Chatbots typically operate with a defined set of rules and parameters which are controlled by the service or platform that hosts the chatbot. For example, chatbots can be hosted on platforms such as a web chat service, a social networking service, a text messaging service, and the like.

Different chatbot engines or vendors such as IBM® CONVERSATION, GOOGLE® API.AI, MICROSOFT® LUIS, AMAZON® LEX, and FACEBOOK® MESSENGER, provide different benefits. However, each of these chatbot vendors communicates based on different communication protocols, provides access to different services, performs separate authentication, and the like. Therefore, a developer typically designs a software application that is able to interact with a single bot engine because designing an application that is capable of interacting with multiple bot engines can be very difficult if not impractical. Instead, the developer typically generates multiple versions of the application for interacting with multiple bot engines where each version is dedicated to communicating with a different bot engine.

SUMMARY

In one example embodiment, provided is a computing system that includes one or more of a network interface configured to receive a bot communication request from a user device, the bot communication request including content from on one or more of a spoken utterance and a typed input received via the user device, and a processor configured to retrieve configuration information including credentials and unique communication protocol information for each of a plurality of bot services, and automatically determine a bot service for responding to the bot communication request from among the plurality of bot services, wherein the processor is further configured to control the network interface to establish a communication channel with the determined bot service based on unique credentials of the determined bot service, and transmit the bot communication request to the determined bot service via the established communication channel based on unique communication protocol information of the determined bot service.

In another example embodiment, provided is a computer-implemented method that includes one or more of receiving a bot communication request from a user device, the bot communication request including content from on one or more of a spoken utterance and a typed input received via the user device, retrieving configuration information including credentials and unique communication protocol information for each of a plurality of bot services, automatically determining a bot service for responding to the bot communication request from among the plurality of bot services, and establishing a communication channel with the determined bot service based on unique credentials of the determined bot service, and transmitting the bot communication request to the determined bot service via the established communication channel based on unique communication protocol information of the determined bot service.

In another example embodiment, provided is a non-transitory computer readable medium having stored therein program instructions that when executed cause a computer to perform one or more of receiving a bot communication request from a user device, the bot communication request including content from on one or more of a spoken utterance and a typed input received via the user device, retrieving configuration information including credentials and unique communication protocol information for each of a plurality of bot services, automatically determining a bot service for responding to the bot communication request from among the plurality of bot services, and establishing a communication channel with the determined bot service based on unique credentials of the determined bot service, and transmitting the bot communication request to the determined bot service via the established communication channel based on unique communication protocol information of the determined bot service.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application relates to a bot service framework, and in particular, to a system that provides an interface between a user device and a plurality of bot services (e.g., web services) by managing connection and communications with the bot services on behalf of the user. The user device may transmit data via any different communication channels such as telephone, interactive video recording (IVR), short messaging service (SMS), web chat, social networking services (e.g., FACEBOOK®, TWITTER®, etc.), and the like. The interface may receive the utterances and messages via the different communication channels and determine a best-fit bot service to handle the request message. For example, the bot services may include bot engines such as IBM® CONVERSATION, IBM WATSON®, GOOGLE® API.AI®, MICROSOFT® LUIS, AMAZON LEX®, and any other desired bot services. The bot services may be web services that are communicated with via the Internet. As another example, the bot services may be stored on a local device or a network-connected device which is accessible without Internet but via a local network.

The bot service framework may be an object oriented PHP framework that includes multiple channel-specific controllers that call upon an environment specific configuration file to connect to multiple bot services. The incoming communication channels are referred to as lines of communication and can include any desired means of communicating with a chatbot such as an IVR (phone), a SMS service, a web chat, a social network forum, and the like. Meanwhile, the application may receive a communication request via one of the incoming communication channels and connect the communication request to one or more of the bot services. Central to each respective bot service is a conversation engine, also referred to as a chat bot, artificial intelligence (AI), or other machine learning model configured to determine next steps within a bi-directional conversation with a user. The framework may utilize a database of responses specific to the incoming communication channel and language of the user to pull a response required for display back to the user, and render the response in an incoming communication channel-specific method such as Voice Extensible Markup Language (VXML), text, and the like.

The bot framework may be based on a model-view-controller (MVC) style frameworks and object oriented programming principles. The bot framework may also render VXML code and SMS messaging using pre-existing behaviors (e.g., word/language databases, VXML index, root, prompt, and end pages. The example embodiments provide a framework in which to easily build new channel agnostic applications as a single application that is able to easily interface between multiple best in class machine learning technologies or other desired bot services based on various factors. It differs from related VXML IVR technologies and the SMS technologies in use today because it is more dynamic, web service driven, and easier to unit test, adapt, and extend.

Figure 1:
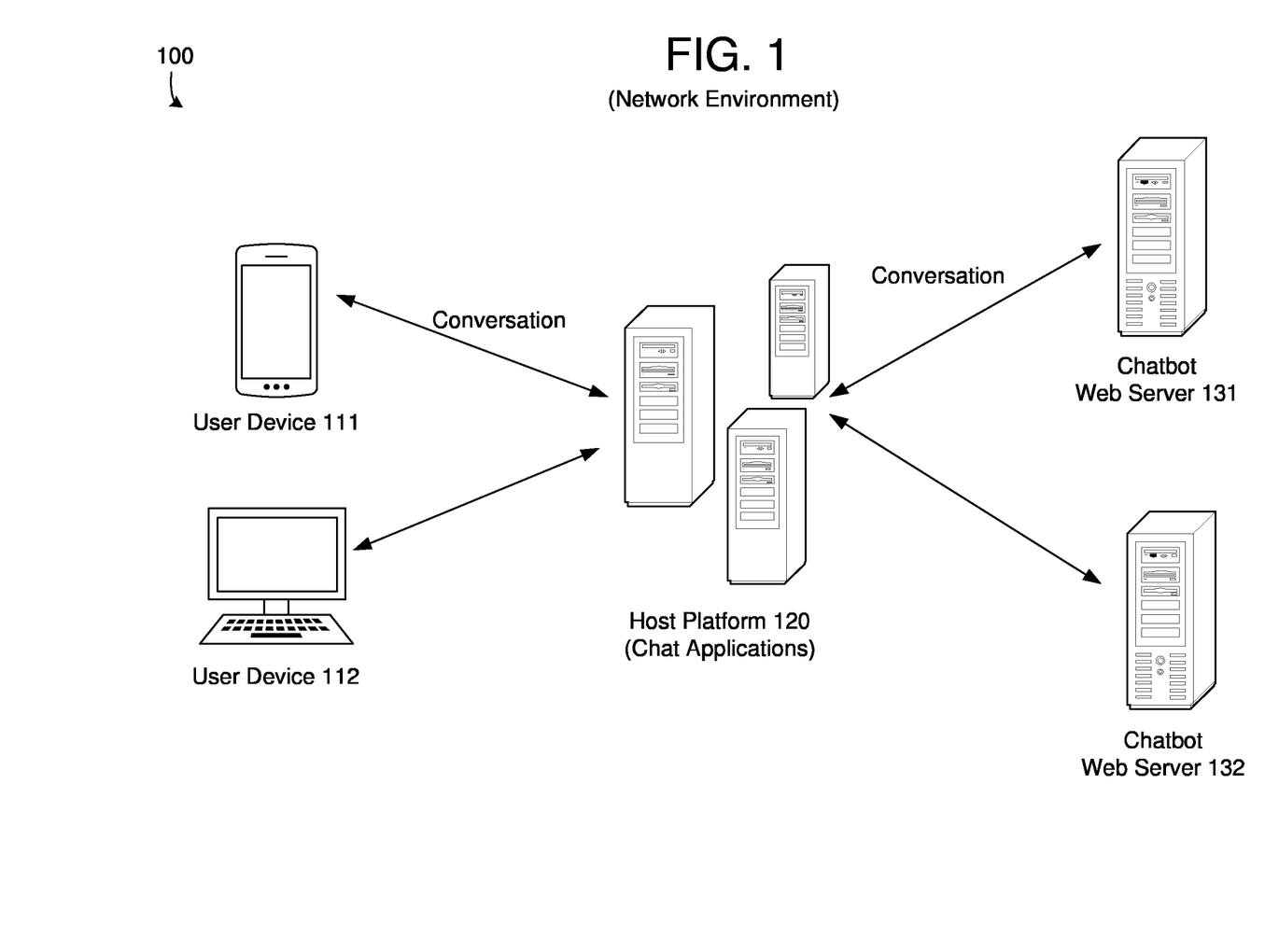
FIG. 1 is a diagram illustrating a network environment for implementing the bot framework in accordance with an example embodiment.

FIG. 1 illustrates a network environment 100 for implementing the bot framework in accordance with an example embodiment. Referring to FIG. 1, the network 100 includes a plurality of user devices 111 and 112, a host platform 120, and a plurality of bot web services 131 and 132. The user devices 111 and 112 may be any known devices capable of interacting with a bot service such as a phone, a smart phone, a video phone, a laptop, a tablet, a desktop computer, a kiosk, a television, an appliance, and the like. The host platform 120 may be a cloud services platform having multiple clusters of computing nodes and configured for hosting different chat applications configured to interact with the user devices (111 and 112) and the bot web services (131 and 132). The user devices 111 and 112 may connect to the host platform 120 via a network such as the Internet, a private network, etc. Also, the host platform 120 may connect to the bot web services 131 and 132 via the network such as the Internet, private network, and the like. It should be appreciated that the network 100 may include many different user devices and many different bot web services, but for convenience only a two of each are shown.

When a user device 111 desires to communicate with a chat bot via one of the bot web services, the user device 111 may transmit a communication request to the host platform 120. Here, the communication request may be received via one of a plurality of different incoming communication lines (or channels) such as IVR, SMS, web chat, and the like. Each incoming lines of communication may connect to the host platform 120 (or application hosted therein) using a different endpoint (e.g., URL, etc.) that enables the host platform 120 to know which format is being used for communication. Also, the communication request may be bot service agnostic meaning that the code used for the request may not be tied to a particular bot web service. The host platform 120 may receive the request and if the request is verbal may convert the speech to text. The host platform 120 may also access a configuration file that identifies different communication mechanisms for the different bot web services 131 and 132. The configuration file may also include different parameters for determining which bot web service 131 and 132 to user for handling the incoming communication request, or the host platform 120 may use a different mechanism such as network availability, type of request being submitted, or the like.

In this example, the host platform 120 routes the incoming communication request (or the text extracted therefrom) to bot web service 131 after dynamically determining bot web service 131 is best suited for handling the incoming communication request. Here, the host platform 120 may detect credentials for accessing the bot web service 131 from the configuration file and establish a communication channel with the bot web service 131 based on the credentials, etc. The host platform 120 may also detect application programming interface (API) information of the bot web service 131 from the configuration file, and transmit communications to the bot web service 131 based on the API information. In this way, the host platform 120 can stand in the place of the user device 111 and communicate with the bot web service 131.

The bot web service 131 may receive the incoming request and generate a response (i.e., conversation) for the user device 111. The bot web service 131 may transmit the response to the user device 111, via the host platform 120. The host platform 120 may receive the response from the bot web service 131 and configure the response based on the format of the incoming communication request sent from the user device 111. For example, the host platform 120 may configure the response in a format of VXML when it is determined that the incoming request was received via IVR. As another example, the host platform 120 may configure the response in a format of SMS or web chat, when the incoming request was received via SMS or web chat, etc. The communication process may continue until the user device 111 ends the conversation. Also, in some embodiments, the communication process may be transferred from bot web service 131 to bot web service 132 by the host platform 120 if it is determined that a different type of communication is being requested or other factors occur which cause the bot web service 132 to be better suited for handling the communication request.

Figure 2:
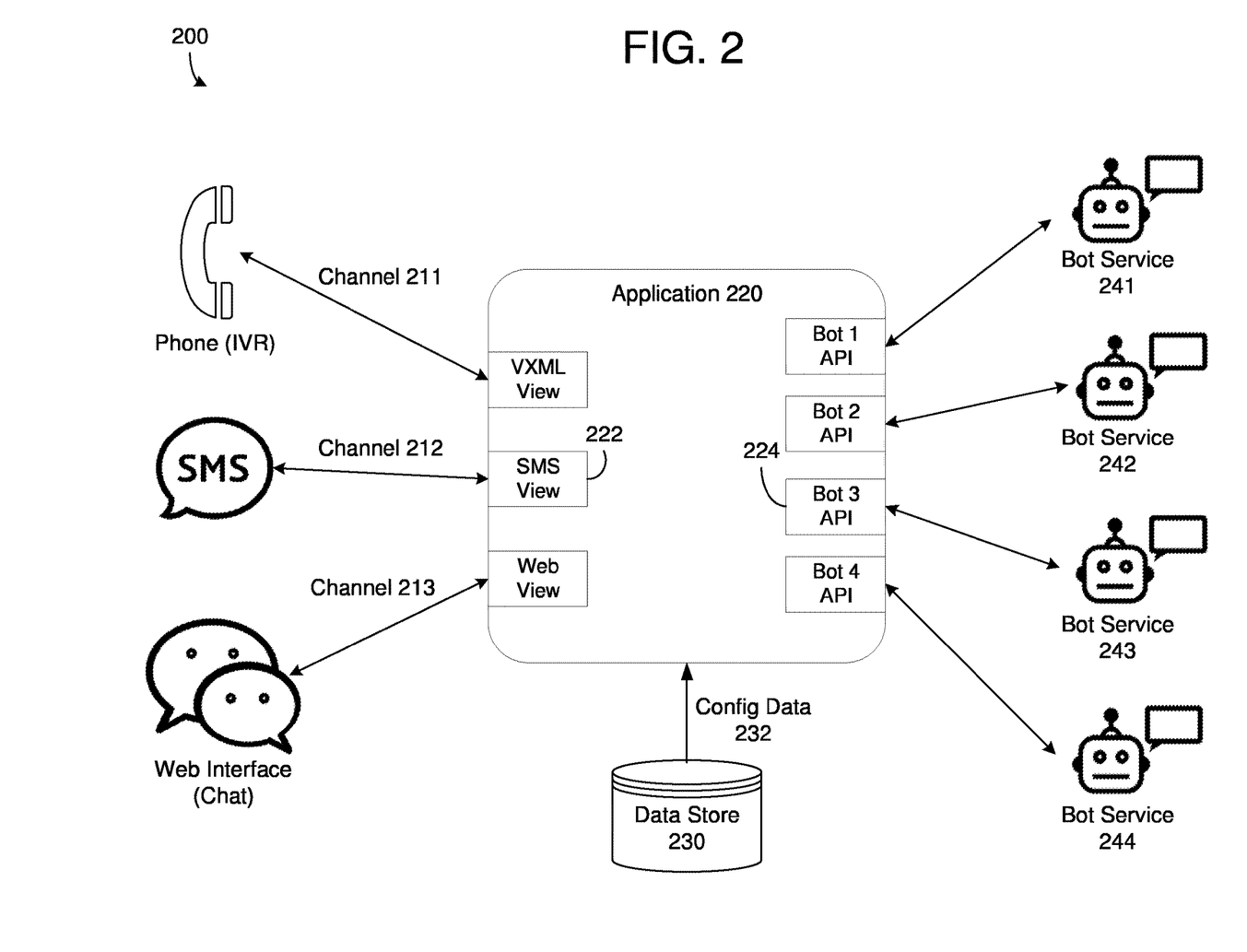
FIG. 2 is a diagram illustrating an architecture of a bot framework in accordance with an example embodiment.

FIG. 2 illustrates an architecture 200 of a bot framework in accordance with an example embodiment. Referring to FIG. 2, the architecture 200 includes an application 220 which may be hosted by the host platform 120 shown in FIG. 1. The application 220 is configured to receive speech, text, or other forms of communication via a plurality of channels 211, 212, and 213 which can include phone, SMS, web chat, or the like. Also, the application 220 is configured to route the communication to a bot service from among a plurality of possible bot services 241, 242, 243, and 244. The bot architecture 200 provides an interface layer (e.g., application 220) between the incoming communication channels, and all of the different bot services. The application 220 may normalize inputs from a variety of potential incoming channels, into a variety of different bot engines, with minimal amount of developer effort.

For example, the application 220 may include one or more controllers which are dedicated to each communication channel 211, 212, and 213, and which control the format of the communication. For example, each of the communication channels 211, 212, and 213 may have a discrete controller and view that normalizes inputs and renders output based on an API. The controllers may be child controllers of a parent controller that performs a "dialog loop" which is an event driven sequence of tasks that feed data into the chat bot engines. These tasks and which engines to engage are defined in a configuration file 232 which may be retrieved by the application 220 from the data store 230. The configuration files may be predetermined by an operator or they may be auto-generated (e.g., via a front-end web interface) and contain information on the bot services used for different features the framework is built to handle, as well as any credentials/endpoints for the bot service vendor-specific APIs.

For example, the application 220 may run on a web application server having a PHP interpreter. The environment provides a view for the channels to reach out to it, and where it can reach out to vendor API's. An example of an SMS channel 212 communication process can include a Mobile Originating (MO) message being transmitted to the application 220 via the channel 212. The application 220 (or another service associated therewith) may receive the text/speech sent by the user and pass it along with the mobile phone number of the user to the application endpoint using the framework provided: (example endpoint: http://applicationhost/company/application/v1/public/SMS/Index?mobile=4025551212$message=hello. For example, the application 220 may load the configuration file 232 for the environment it is operating in from the data store 230, and then connect to several API's, including the chatbot webservice provided by one of the above listed vendors. This is done using a CURL interface, and then the results are parsed. Each of the chatbot vendors provide a mechanism for authenticating into and attaching to the correct chatbot that is configured for the application. The endpoint and authentication details are stored in the environment specific config file 232 in the framework. Based on the results of the chatbot, an utterance is assembled from a voice service and transmitted back to the user via a channel specific view which in this case is SMS.

Each of the communication channels 211, 212, and 213 may reach the application 220 via a different respective URL. As a non-limiting example, the URL may break down into host/clientname/applicationname/version/public/channel/controllermethod, but embodiments are not limited thereto. Client and environment specific configuration files may be provided as part of the application 220 which a developer includes in the deployment of a chat bot application. The application 220 then reads its local configuration and uses it to provide credentials and load the correct chatbot API's.

According to various aspects, the framework described herein may take the provided session state out of context services, as well as the user verbatim utterance, and transform that input data into a version consumable by a specific chatbot API from among a plurality of different chatbot services. It will then take the result of the chatbot API and parse it into a easily consumable session state to be saved back into context services once an interaction is complete. The framework, based on the chatbot API's direction, loads the correct verbiage to play for the specific channel based on a unified token from a database (which may be referred to as a voice service provider). The verbiage is then rendered via the appropriate channel view, into either IVR prompting, SMS messaging, or web display.

Figure 3A:
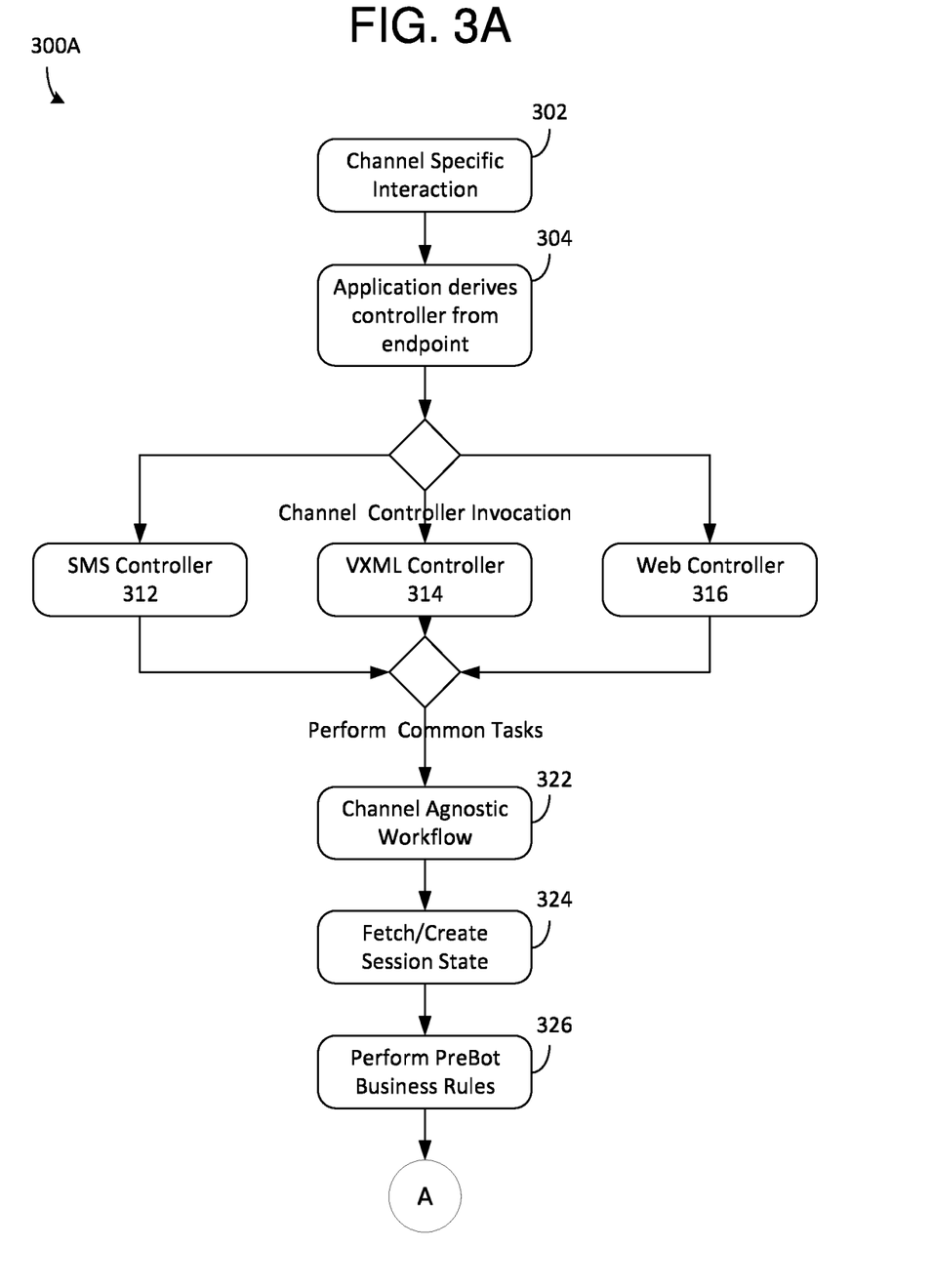
FIGS. 3A-3B are diagrams illustrating a process of performing bot service communications in accordance with an example embodiment.
Figure 3B:
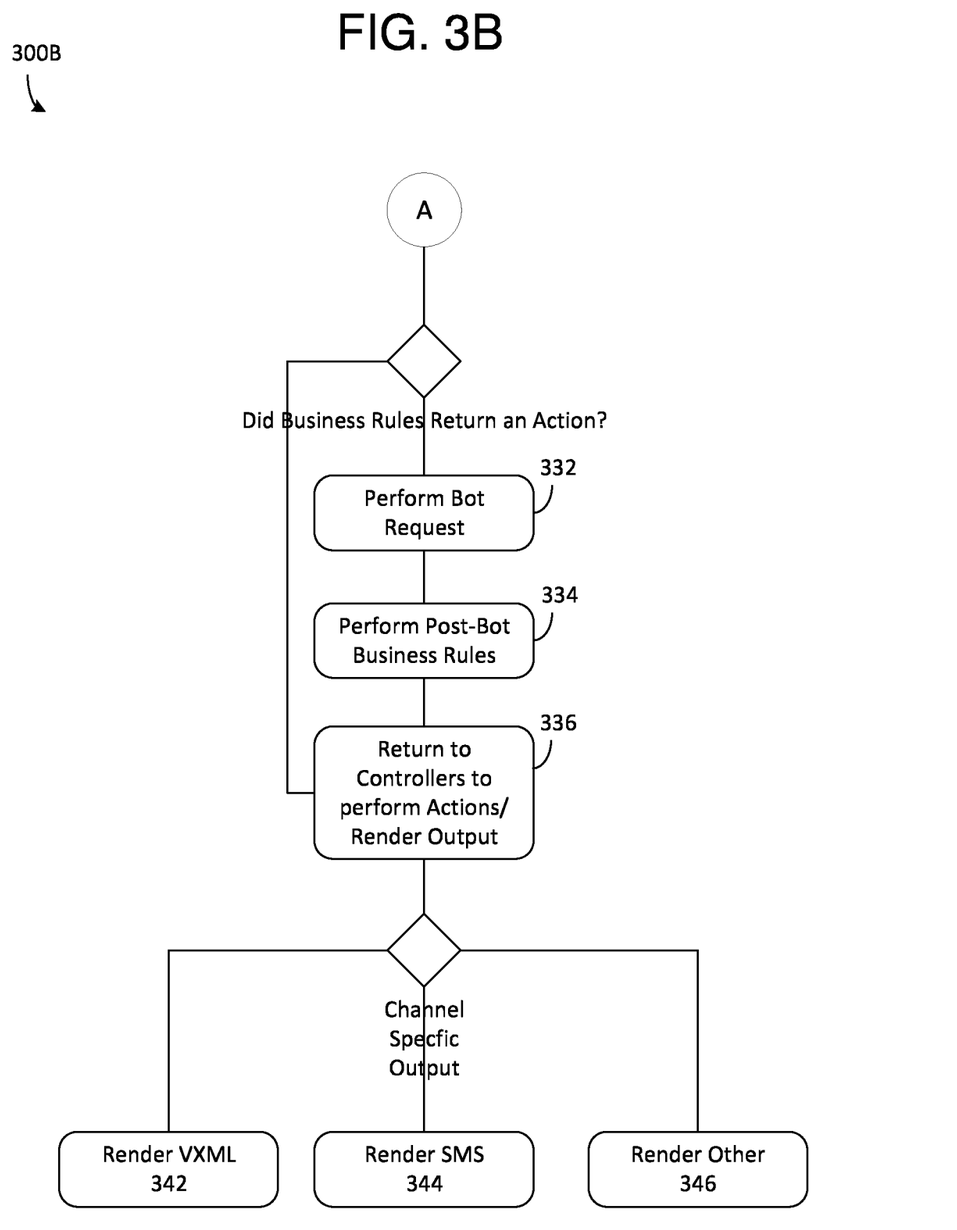

FIGS. 3A-3B illustrate a process 300 of performing bot service communications in accordance with an example embodiment. Referring to FIG. 3A, the process 300A begins with a channel specific interaction in 302. For example, the user may type an input into a message or speak an utterance into a phone (e.g., an IVR in which speech is converted using speech to text services and provided to the application as a text verbatim), SMS, Facebook Message, or Web Chat. In 304, the application derives a controller from endpoint. For example, each incoming communication channel may be provided a different URL endpoint to hit the same application. For example, each URL may share a common root, but one or more portions (e.g., the final 2 items) of the web URL inform the framework which channel and activity are being requested. As a non-limiting example, for a URL ending in SMS/Index, an SMS transaction will occur. As another example, VXML/Prompt would be an example of a VXML Prompt request.

Next, a channel controller is invoked in one of 312, 314, and 316. The different channel controllers indicate the different controller classes that are invoked based on the URL provided. It should be appreciated that there may be more controllers that can be built, depending on channels that are desired to be supported by the framework. All of the channel controllers 312, 314, and 316 are child controllers of a parent class referred to as dialog. The parent class has a common method which performs common tasks 322, 324, and 326 which are listed within the processor 300A. For example, in 322 the process calls a method getAction which triggers the common tasks. In 324, fetch/create session state refers to all interactions with the framework will attempt to reach out to a context service. If context is found, session is opened with that predefined dataset in 324, and if no context is found, an empty session is begun in 324. In 326, pre bot business rules may be performed. The rules may be application specific rules, either by hitting a dedicated business rules API, or using custom coded rules. These rules may manipulate the session state, and possibly sanitize the original user utterance. In some embodiments, pre bot rules may provide an action event. In the case of an action event at this step, control is returned to the channel specific controller.

Referring now to FIG. 3B, the process 300B continues and determines whether the business rules returned an action (e.g., a response to send back to the user). In 332, if no pre-bot action is returned, the chatbot will be queried with the session state, and utterance of the user. The chatbot may be configured such that the framework can determine an action, update context, and resource name back from it after parsing the result. Meanwhile, in 334 the post-bot rules may be performed to return values from the bot that are stored in context, and post bot business rules may be invoked to permit challenger and other adjustments to be made to the bot outcome. Once any data mutations are complete and updated in context, control is returned back to the channel specific controller.

Once control returns to the channel specific controller in 336, the action list that may be invoked in 336 may include one or more of perform an API request which includes reaching out to a predefined API provided as a resource name, and loading its results into context. Other actions in the action list may include a retry—restart the action loop with the now modified context, respond—send a message back to the user on the same channel using a verbiage token provided as a resource name, transfer—notify the user of a transfer event, and then transfer the user to a live agent, disconnect—send a message back to the user on the same channel using a verbiage token provided as a resource name, then terminate the context, indicating a "complete" interaction, and FAQ—query an FAQ service API, and provide the resulting raw text back to the user. Any responses to be sent back to the user may be rendered in a channel specific way in one of 342, 344, and 346. For example, the response may be a JSON return for Web 346, VXML code for IVR 342, or REPLY: tags for SMS 344. The application may then terminate and execute again on the next response from the user.

Figure 4:
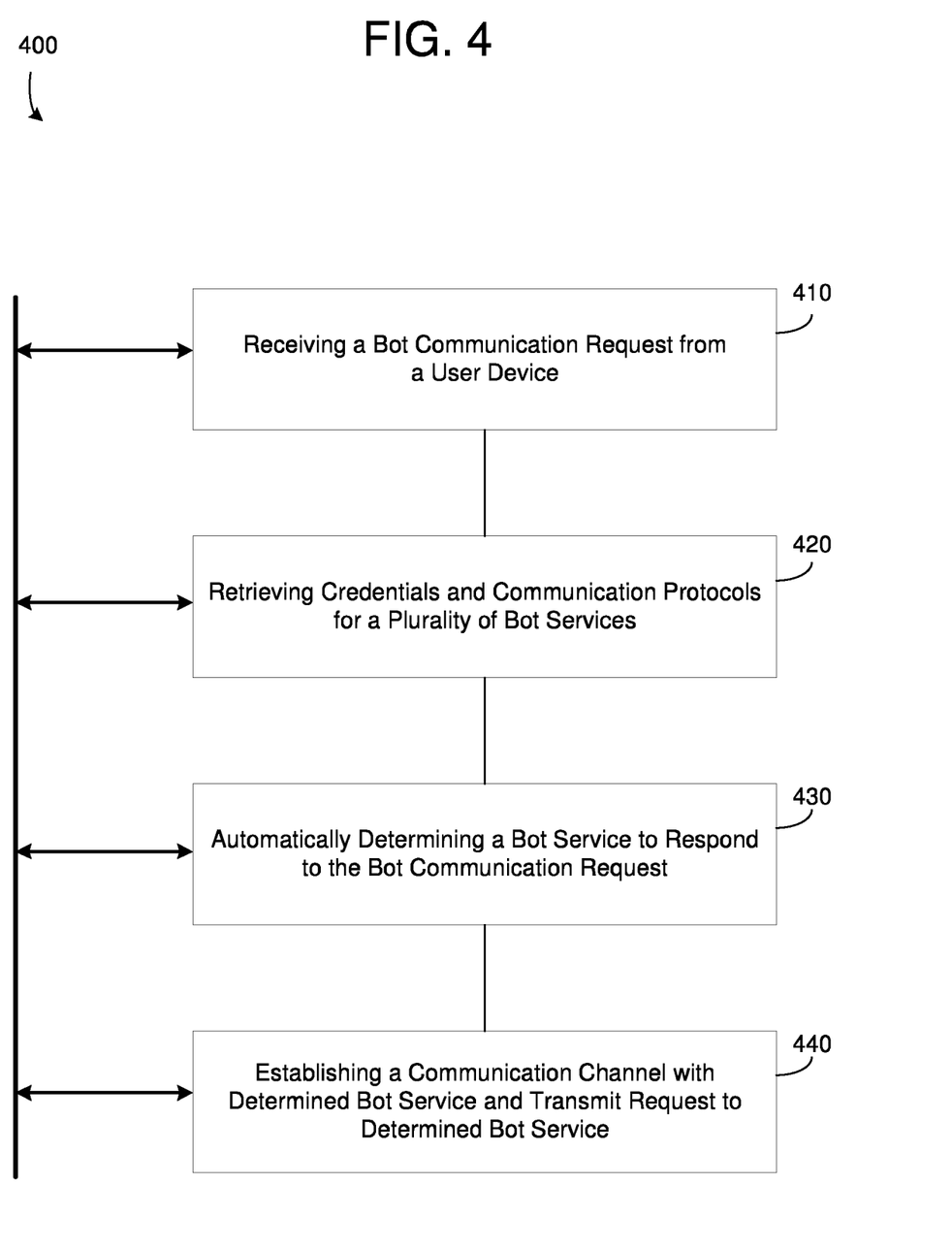
FIG. 4 is a diagram illustrating a method for establishing a communication channel with a bot service in accordance with an example embodiment.

FIG. 4 illustrates a method 400 for establishing a communication channel with a bot service in accordance with an example embodiment. For example, the method 400 may be performed by a host platform such as a server, cloud computing system, database, or other computing system. In 410, the method includes receiving a bot communication request from a user device. For example, the bot communication request may include content such as text, words, phrases, sentences, characters, and the like, which are extracted from a spoken utterance or a typed input received via the user device. The bot communication request may also contact information identifying a user and/or a user device such as a phone number, an email address, a device identification (ID), and the like. The communication request may have a heading or other indicator which provides additional context about the communication request such as a type (e.g., human resources, customer service, help desk, etc.) The bot communication request may be bot services agnostic. That is, the bot communication request may not be configured to be processed by any particular bot service. Accordingly, a developer of the application may not be required to develop specific code related to a bot service.

In 420, the method includes retrieving configuration information which includes configuration data for use by the interface in communicating with each of a plurality of bot services. For example, the configuration data may include credentials such as authentication information, an endpoint URL, and the like, and communication protocol information for each of a plurality of bot services such as one or more APIs that are unique to the bot service and also different services provided by the bot service. In 430, the method includes automatically determining a bot service for responding to the bot communication request from among the plurality of bot services. For example, the interface may automatically determine a bot service based on the content (e.g., language, words, utterances, type, etc.) included in the bot communication request and a bot service that is best suited for handling a particular request type associated with the content. The interface may determine which bot services is best based on various factors including the type of communication channel through with the communication request was received, predetermined rules, availability of the bot services, network connections with the different bot services, and the like.

In 440, the method includes establishing a communication channel with the determined bot service based on unique credentials of the determined bot service, and transmitting the bot communication request to the determined bot service via the established communication channel based on unique communication protocol information of the determined bot service. For example, the establishing may include establishing the communication channel with the determined bot service based on authentication information and an endpoint that is unique to the determined bot service. As another example, the transmitting may include transmitting the bot communication request to the determined bot service based on unique API information of the determined bot service.

Although not shown in FIG. 4, in some embodiments, the method may further include receiving a response message from the determined bot service and transmitting the response message to the user device. In this example, the method may further include determining a communication channel format of the user device which was used to transmit the bot communication request, and modifying the response message from the determined bot service to match the determined communication channel format. For example, the communication channel format may include any of IVR, SMS, web chat, or the like.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
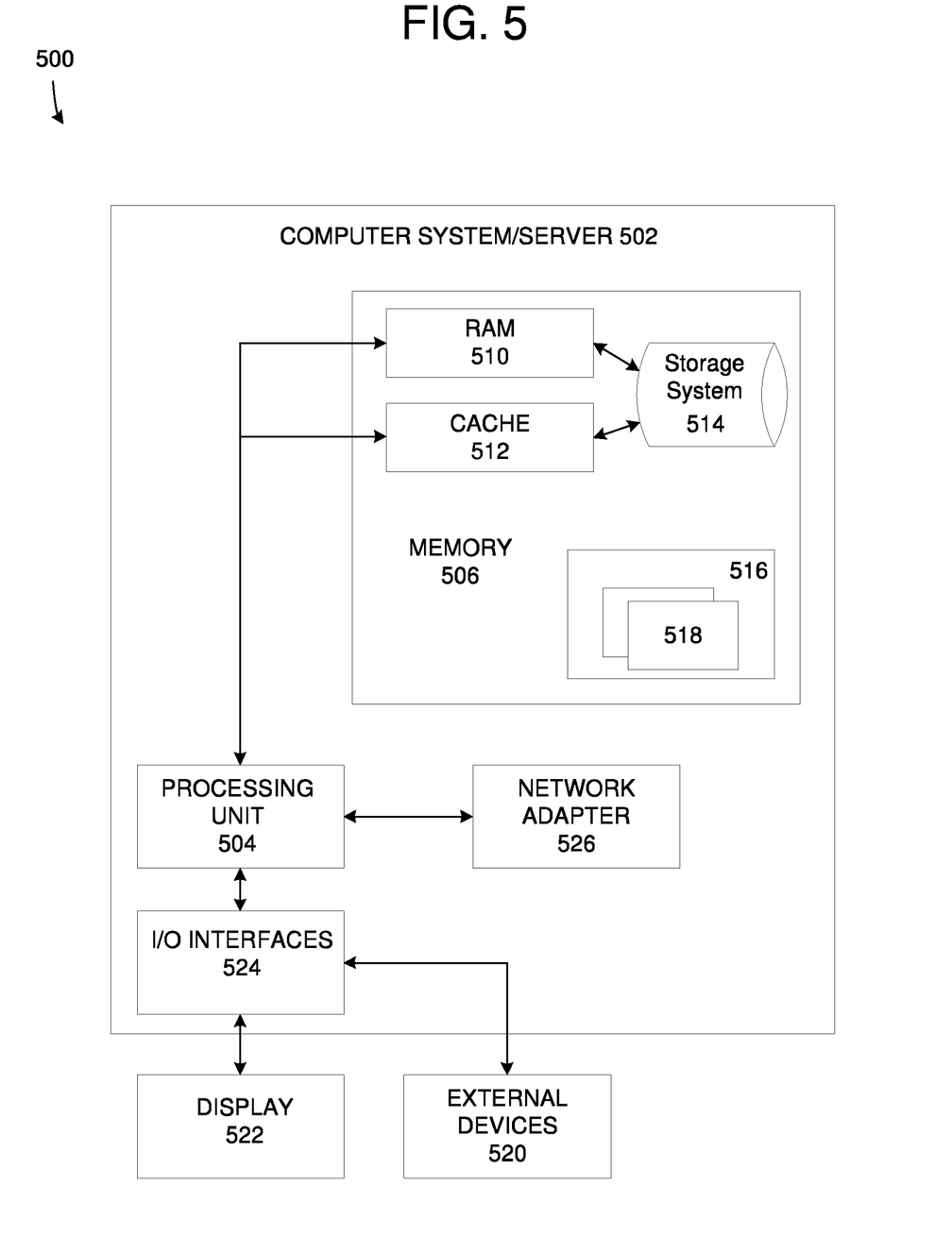
FIG. 5 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a blockchain node, a database, a server, a cloud platform, a network, a combination thereof, and the like.

FIG. 5 is not intended to suggest any limitation as to the scope of use or functionality of embodiments of the application described herein. Regardless, the computing system 500 (or node 500) is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. The computing node 500 may be the host platform 120 shown in FIG. 1 or another device or combination of devices such as a server, cloud platform, database, and/or the like. Also, the computing node 500 may perform the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526 (also referred to as a network interface). As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the network interface 526 may receive a bot communication request from a user device. Here, the bot communication request may include content from on one or more of a spoken utterance and a typed input received via the user device. The bot communication request may not be intended for any particular bot service. That is, the bot communication request may be bot service agnostic. The processor 504 may retrieve configuration information including credentials and unique communication protocol information for each of a plurality of bot services, and automatically determine a bot service for responding to the bot communication request from among the plurality of bot services. For example, the processor 504 may retrieve a configuration file from the storage 506 or some other data store. The configuration file may include authentication information, API information, services, security, an endpoint address, and the like, for communicating with each of the plurality of bot services. The processor 504 may further control the network interface 526 to establish a communication channel with the determined bot service based on unique credentials of the determined bot service, and transmit the bot communication request to the determined bot service via the established communication channel based on unique communication protocol information of the determined bot service.

In some embodiments, the processor 504 may retrieve authentication information and an endpoint for each of the respective plurality of bot services, and control the network interface 526 to establish the communication channel with the determined bot service based on unique authentication information and a unique endpoint address that is unique to the determined bot service. As another example, the processor 504 may retrieve unique API information for communicating with each of the plurality of bot services, and control the network interface 526 to transmit the bot communication request to the determined bot service based on unique API information of the determined bot service.

According to various aspects, the processor 504 may automatically determine the bot service from among the plurality of bot services based on one or more attributes such as language included within the bot communication request, network availability, a type of the request, a user device transmitting the request, and the like. As another example, the processor 504 may determine the bot service based on a selection from the user.

In some embodiments, the network interface 526 may receive a response message from the determined bot service and transmit the response message to the user device. In this example, the processor 504 may determine a communication channel format of the user device which was used to transmit the bot communication request, and modify the response message from the determined bot service to match the determined communication channel format. Here, the communication channel format may include IVR, SMS, or web chat.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A computing system comprising:
a network interface configured to receive a bot communication request from a user device, the bot communication request comprising content from on one or more of a spoken utterance and a typed input received via the user device; and
a processor configured to:
retrieve configuration information comprising credentials and unique communication protocol information for each of a plurality of bot services, the configuration information further comprising at least one of application programming interface (API) information, services information, security information, and an endpoint address for communicating with each of the plurality of bot services, and
automatically identify a bot service for responding to the bot communication request from among the plurality of bot services based on the configuration information and information contained in the bot communication request;
wherein the processor is further configured to:
control the network interface to establish a communication channel with the determined bot service based on unique credentials of the determined bot service, and
transmit the bot communication request to the determined bot service via the established communication channel based on unique communication protocol information of the determined bot service.

2. The computing system of claim 1, wherein the received bot communication request comprises a bot service-agnostic communication request.

3. The computing system of claim 1, wherein the processor is configured to retrieve authentication information and the endpoint address for communicating with each of the respective plurality of bot services, and control the network interface to establish the communication channel with the determined bot service based on authentication information and an endpoint that is unique to the determined bot service.

4. The computing system of claim 1, wherein the processor is configured to retrieve unique application programming interface (API) information for communicating with each of the plurality of bot services, and control the network interface to transmit the bot communication request to the determined bot service based on unique API information of the determined bot service.

5. The computing system of claim 1, wherein the processor is configured to automatically determine the bot service from among the plurality of bot services based on language included within the bot communication request.

6. The computing system of claim 1, wherein the network interface is further configured to receive a response message from the determined bot service and transmit the response message to the user device.

7. The computing system of claim 6, wherein the processor is further configured to determine a communication channel format of the user device which was used to transmit the bot communication request, and modify the response message from the determined bot service to match the determined communication channel format.

8. The computing system of claim 7, wherein the processor is configured to modify the response message to have a communication channel format of any of interactive voice response (IVR), short message service (SMS), and web chat.

9. A computer-implemented method, comprising:
receiving a bot communication request from a user device, the bot communication request comprising content from on one or more of a spoken utterance and a typed input received via the user device;
retrieving configuration information comprising credentials and unique communication protocol information for each of a plurality of bot services, the configuration information further comprising at least one of application programming interface (API) information, services information, security information, and an endpoint address for communicating with each of the plurality of bot services;
automatically identifying a bot service for responding to the bot communication request from among the plurality of bot services based on the configuration information and information contained in the bot communication request; and
establishing a communication channel with the determined bot service based on unique credentials of the determined bot service, and transmitting the bot communication request to the determined bot service via the established communication channel based on unique communication protocol information of the determined bot service.

10. The computer-implemented method of claim 9, wherein the received bot communication request comprises a bot service-agnostic communication request.

11. The computer-implemented method of claim 9, wherein the retrieved configuration information comprises authentication information and the endpoint address for communicating with each of the respective plurality of bot services, and the establishing comprises establishing the communication channel with the determined bot service based on authentication information and an endpoint that is unique to the determined bot service.

12. The computer-implemented method of claim 9, wherein the retrieved configuration information comprises unique application programming interface (API) information for communicating with each of the plurality of bot services, and the transmitting comprises transmitting the bot communication request to the determined bot service based on unique API information of the determined bot service.

13. The computer-implemented method of claim 9, wherein the automatically determining comprises automatically determining the bot service from among the plurality of bot services based on language included within the bot communication request.

14. The computer-implemented method of claim 9, wherein the method further comprises receiving a response message from the determined bot service and transmitting the response message to the user device.

15. The computer-implemented method of claim 14, wherein the method further comprises determining a communication channel format of the user device which was used to transmit the bot communication request, and modifying the response message from the determined bot service to match the determined communication channel format.

16. The computer-implemented method of claim 15, wherein the modifying comprises modifying the response message to have a communication channel format of any of interactive voice response (IVR), short message service (SMS), and web chat.

17. A non-transitory computer readable medium having stored therein one or more program instructions that when executed by a processor cause the processor to perform a method comprising:
  receiving a bot communication request from a user device, the bot communication request comprising content from on one or more of a spoken utterance and a typed input received via the user device;
  retrieving configuration information comprising credentials and unique communication protocol information for each of a plurality of bot services, the configuration information further comprising at least one of application programming interface (API) information, services information, security information, and an endpoint address for communicating with each of the plurality of bot services;
  automatically identifying a bot service for responding to the bot communication request from among the plurality of bot services based on the configuration information and information contained in the bot communication request; and
  establishing a communication channel with the determined bot service based on unique credentials of the determined bot service, and transmitting the bot communication request to the determined bot service via the established communication channel based on unique communication protocol information of the determined bot service.

18. The non-transitory computer readable medium of claim 17, wherein the received bot communication request comprises a bot service-agnostic communication request.

19. The non-transitory computer readable medium of claim 17, wherein the retrieved configuration information comprises authentication information and the endpoint address for communicating with each of the respective plurality of bot services, and the establishing comprises establishing the communication channel with the determined bot service based on authentication information and an endpoint that is unique to the determined bot service.

20. The non-transitory computer readable medium of claim 17, wherein the retrieved configuration information comprises unique application programming interface (API) information for communicating with each of the plurality of bot services, and the transmitting comprises transmitting the bot communication request to the determined bot service based on unique API information of the determined bot service.

\* \* \* \* \*